US005573863A

United States Patent [19]

Hayakawa et al.

[11] Patent Number: 5,573,863

[45] Date of Patent: Nov. 12, 1996

[54] SOFT MAGNETIC ALLOY AND PLANE MAGNETIC ELEMENT

[75] Inventors: Ysuo Hayakawa, Nagaoka; Akinori Kojima, Sendai; Akihiro Makino, Nagaoka, all of Japan

[73] Assignee: Alps Electric Co., Ltd., Tokyo, Japan

[21] Appl. No.: 201,831

[22] Filed: Feb. 25, 1994

[30] Foreign Application Priority Data

Mar. 5, 1993 [JP] Japan .................................... 5-045557
Dec. 28, 1993 [JP] Japan .................................... 5-338333

[51] Int. Cl.[6] ........................................................ G11B 5/66

[52] U.S. Cl. ............................... 428/684 T; 428/684 TR; 428/684 R; 428/611; 428/610; 428/621; 428/622; 428/628; 428/629; 428/632; 428/678; 428/900; 428/692

[58] Field of Search ......................... 428/684 T, 684 TR, 428/611, 692, 684 R, 900, 610, 621, 622, 628, 629, 632, 678

[56] References Cited

U.S. PATENT DOCUMENTS 3,965,463 6/1976 Chaudhari ................................ 365/34
4,257,830 3/1981 Tsuya .................................... 232/43.1
4,649,983 3/1987 Laxmanan ............................ 164/154.8
4,762,575 8/1988 Sakakura ................................ 148/111
4,807,693 2/1989 Laxmanan .............................. 164/452
5,028,280 7/1991 Ihara ..................................... 148/306
5,068,050 11/1991 Inomata ............................. 252/62.51
5,117,321 5/1992 Nakanishi .............................. 360/120
5,236,791 8/1993 Yahisa ............................. 428/694 TP
5,252,148 10/1993 Shigeta ................................ 148/307
5,262,915 11/1993 Terunuma ............................ 360/120
5,352,268 10/1994 Meguro ................................. 75/338
5,382,305 1/1995 Terunuma ............................ 148/306

FOREIGN PATENT DOCUMENTS 2199027 8/1990 Japan .

*Primary Examiner*—Leszek Kiliman
*Attorney, Agent, or Firm*—Guy W. Shoup; Patrick T. Bever

[57] ABSTRACT

A soft magnetic alloy film includes: a fine crystalline phase having an average grain size of 10 nm or less and essentially consisting of Fe of b-c-c structure; and an amorphous phase containing a rare earth element or at least one of the elements, Ti, Zr, Hf, V, Nb, Ta and W, and O (oxygen) in a large amount, the fine crystalline phase and amorphous phase existing in a mixed state, with the proportion of the fine crystalline phase of Fe of b-c-c structure to the entire structure being 50% or less. A plane magnetic element employs such a soft magnetic alloy.

10 Claims, 12 Drawing Sheets

SOFT MAGNETIC ALLOY AND PLANE MAGNETIC ELEMENT

BACKGROUND OF THE INVENTION

The present invention relates to a soft magnetic alloy suitable for magnetic head cores, thin film inductors, thin film transformers, switching elements, etc., and to a plane magnetic element using such a soft magnetic alloy.

As a result of the recent miniaturization and enhancement in performance of magnetic elements, there is a demand for a soft magnetic material exhibiting a high magnetic permeability in the frequency range of several hundred MHz or more, and, in particular, one having a high saturation magnetic flux density of 5 kG or more, a high specific resistance, and a low coercive force. Above all, there is a demand for a soft magnetic material having a high specific resistance as a material for transformers.

Fe or alloys containing Fe as a main component are widely known as magnetic materials having a high saturation magnetic flux density. However, when formed into a magnetic film by a film formation technique, such as sputtering, such an alloy exhibits a high coercive force and a low specific resistance although it has a high saturation magnetic flux density. Thus, it is difficult to obtain satisfactory soft magnetic properties from such an alloy.

One of the causes for the reduction in magnetic permeability in the high frequency range, is the loss due to the generation of an eddy current. To prevent the generation of an eddy current, a reduction in film thickness and an increase in thin film resistivity are required.

However, it is extremely difficult to achieve an increase in specific resistance without any deterioration in magnetic properties. The specific resistance of a soft magnetic thin film made of an alloy, such as sendust, is as small as tens μΩ.cm. What is required is a soft magnetic alloy which has an increased specific resistance, and yet ensures a saturation magnetic flux density of at least 0.5 T.

Further, when realizing an alloy in the form of a thin film, it is still more difficult to obtain satisfactory soft magnetic properties, due to the influences of the generation of magnetostriction, etc.

The present invention has been made with a view toward solving the above problems. It is accordingly an object of the present invention to provide a soft magnetic alloy having a high specific resistance as a magnetic material for use in the high frequency range, etc., and a plane magnetic element using such a soft magnetic alloy.

SUMMARY OF THE INVENTION

To achieve the above object, there is provided, in accordance with the present invention, a soft magnetic alloy film comprising: a fine crystalline phase having an average gain size of 10 nm or less and essentially consisting of Fe of b-c-c structure; and an amorphous phase containing a rare earth element or at least one of the elements, T, Zr, Hf, V, Nb, Ta and W, and O (oxygen) in a large amount, said fine crystalline phase and amorphous phase existing in a mixed state, with the proportion of the fine crystalline phase of Fe of b-c-c structure to the entire structure being 50% or less.

The alloy preferably has a composition of $Fe_aM_bO_c$; where M represents at least one of the rare earth elements or a mixture thereof, the composition ratios a, b and c (in atomic %) being as follows:

$50 \leqq a \leqq 70$ $5 \leqq b \leqq 30$ $10 \leqq c \leqq 30$ $a + b + c = 100$ Further, a composition of $Fe_dM'_eOf$ is also possible; where M' represents at least one of the elements, Ti, Zr, Hf, V, Nb, Ta and W, or a mixture thereof, the composition ratios d, e and f (in atomic %) being as follows:

$45 \leqq d \leqq 70$ $5 \leqq e \leqq 30$ $10 \leqq f \leqq 40$ $d + e - f = 100$ In accordance with the present invention, there is further provided a plane magnetic element comprising: a substrate, a spiral plane coil, an insulating layer, and a soft magnetic film as described above, laid one on top of the other.

BRIEF DESCRIPTION OF THE DRAWINGS

FIG. 12 (*b*) is a sectional view taken along the line A—A of FIG. 12 (*a*)

DETAILED DESCRIPTION OF THE INVENTION

Figure 1A:
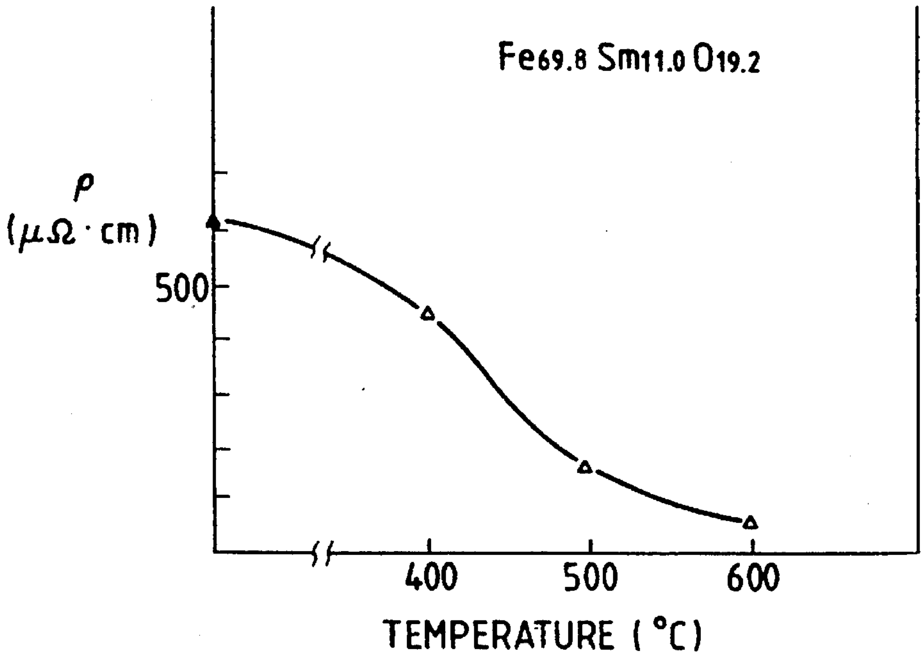
FIG. 1 is a graph showing the relationship between heat-treatment temperature, saturation magnetic flux density (Bs), coercive force (Hc) and specific resistance (ρ) in an alloy film having a composition of $Fe_{69.8}Sm_{11.0}O_{19.2}$.

The present invention will now be described in detail.

In the soft magnetic alloy of the present invention, Fe is the main component, which provides magnetic properties. To obtain a high saturation magnetic flux density, it is desirable for the Fe content to be as large as possible. However, an Fe content of 70 atomic % or more would result in a rather low specific resistance. On the other hand, an Fe content below the lower limit of the Fe content range of the present invention, would result in a rather low saturation magnetic flux density although it would enable a high specific resistance to be obtained.

A rare earth element represented by symbol M (which is one of the following elements: Sc and Y, which belong to Group 3A of the Periodic Table, and the lanthanoids, including La, Ce, Pr, Nd, Pm, Sm, Eu, Gd, Td, Dy, Ho, Er, Tm, Yb, Lu, etc.) and an element represented by symbol M' (which is one of the elements belonging to Groups 4A, 5A and 6A of the Periodic Table, such as Ti. Zr, Hf, V, Nb, Ta and W) are essential in obtaining soft magnetic properties. These elements easily associate with oxygen to form oxides. By appropriately adjusting the content of such an oxide, it is possible to attain an increase in specific resistance.

With the composition range of the present invention, it is possible to obtain a high specific resistance ranging from 400 to $2.0\times10^5$ μΩ.cm. By attaining a high specific resistance, the loss due to an eddy current can be mitigated, the reduction in magnetic permeability in the high frequency range can be restrained, and an improvement in high frequency properties can be achieved.

It should be noted, in particular, that Hf is supposed to have an ability to restrain magnetostriction.

By annealing an alloy film at a temperature of 30020 to 600° C., it is possible to obtain excellent soft magnetic properties, with the internal stresses of the alloy film removed.

Such a magnetic film consisting of an alloy is formed by a thin film formation technique, such as sputtering or evaporation. The sputtering can be performed by using an existing sputtering apparatus, such as an RF two-pole sputter, a DC sputter, a magnetron sputter, a three-pole sputter, an ion beam sputter, or an opposed-target type sputter.

In adding O (oxygen) to a soft magnetic alloy film, a reactant type sputter is effective, which performs sputtering in a mixture gas atmosphere obtained by mixing an inert gas like Ar with $O_2$ gas.

Apart from this, it is also possible to produce a soft magnetic alloy film in an inert gas like Ar by using a composite target which is obtained by arranging various pellets of a rare earth element or the like on an Fe target.

Further, it is possible for the soft magnetic alloy structure to entirely consist of an amorphous phase or to partly include a fine crystalline phase of Fe of b-c-c structure. A soft magnetic alloy texture whose fine crystal phase has a large grain size and in which the crystalline phase constitutes a large proportion, has a relatively low specific resistance, whereas one in which an amorphous phase containing a large amount of oxygen constitutes the greater part of the structure tends to have a high specific resistance.

By forming a spiral plane coil on a substrate by using a soft magnetic alloy film having excellent magnetic properties and a high specific resistance as mentioned above, it is possible to obtain a magnetic element exhibiting excellent magnetic properties.

[Embodiments ]

(1) Film Formation

Sputtering was performed with an RF magnetron sputtering apparatus by using a composite target consisting of an Fe target on which various pellets of the element M or M' of the present invention are arranged, in an atmosphere consisting of a mixture of Ar and 0.1 to 1.0% of O, adjusting the sputtering time so as to obtain a film having a thickness of approximately 2 μ. The principal sputtering conditions were as follows:

Preliminary evacuation: $1\times10^6$ Torr or less

High frequency power: 400 W

Ar gas pressure: $6\sim8\times10^{-8}$ Torr

Substrate: Crystallized glass substrate ( indirect water cooling)

Inter-electrode distance: 72 mm (2) Annealing

To improve the soft magnetic properties of the film, the film thus formed was subjected to annealing in a vacuum heating furnace, in which the film was retained in a non-magnetic environment or in a magnetic field at a temperature of 300° to 600° C. for 60 to 360 minutes, and then gradually cooled.

(3) Measurement

The composition of the alloy magnetic film thus obtained was examined by an inert gas fusion infrared absorption method.

(Test 1)

First, the saturation magnetic flux density (Bs) and the coercive force (Hc) of an alloy magnetic film prior to annealing (2) were measured by VSM. Further, the specific resistance (ρ) of the alloy magnetic film was measured by a four-terminal method.

Subsequently, the saturation magnetic flux density and coercive force of the alloy magnetic film after heat treatment (2) were measured by VSM. Further, the specific resistance of the alloy magnetic film was measured by the four terminal method.

Figure 1B:
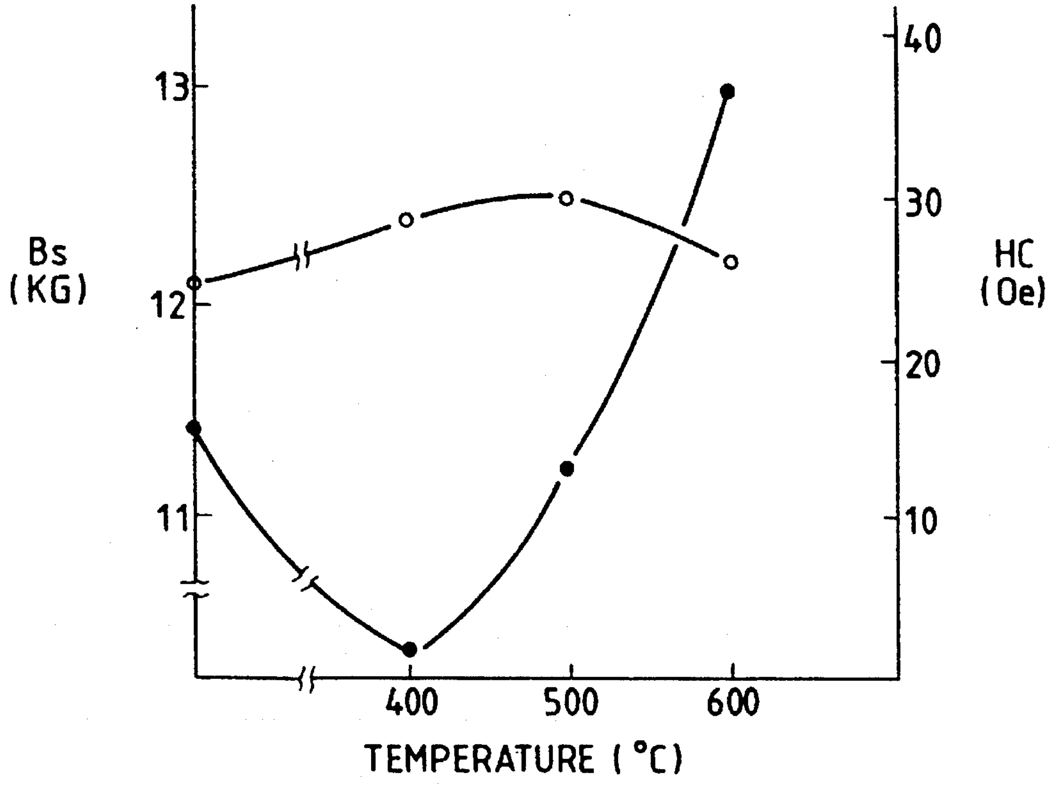

FIG. 1 shows the results of the measurement of the saturation magnetic flux density, coercive force and specific resistance of an alloy film having a composition of $Fe_{69.8}Sm_{11.0}O_{19.2}$. In FIG. 1, the saturation magnetic flux density is indicated by (-○-○-), the coercive force is indicated by (-●-●-), and the specific resistance is indicated by (-Δ-Δ-).

Figure 2A:
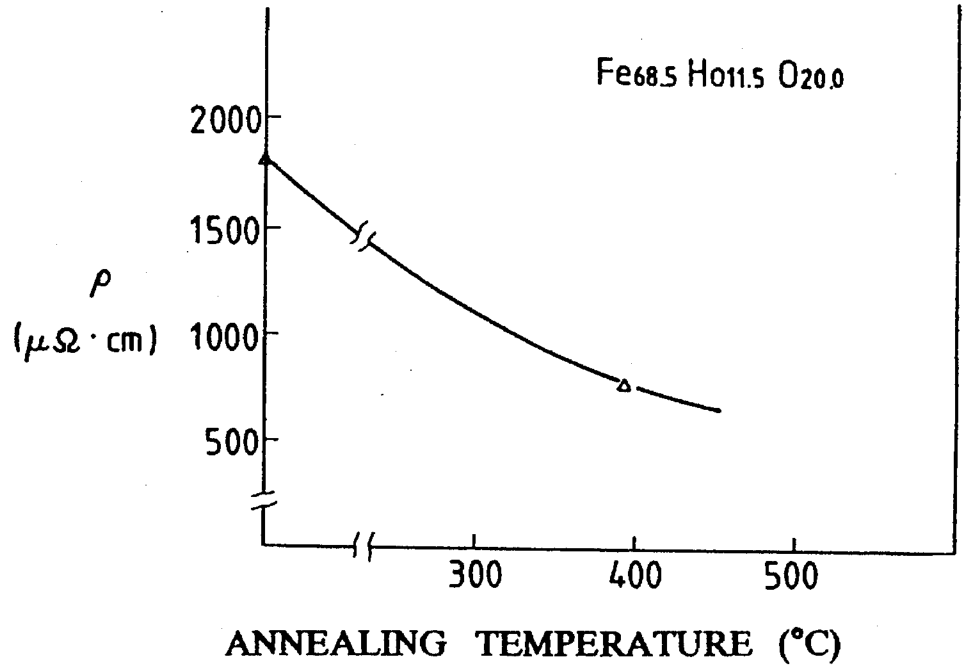
FIG. 2 is a graph showing the relationship between heat-treatment temperature, saturation magnetic flux density, coercive force and specific resistance in an alloy film having a composition of $Fe_{68.5}Ho_{11.5}O_{20.0}$.
Figure 2B:
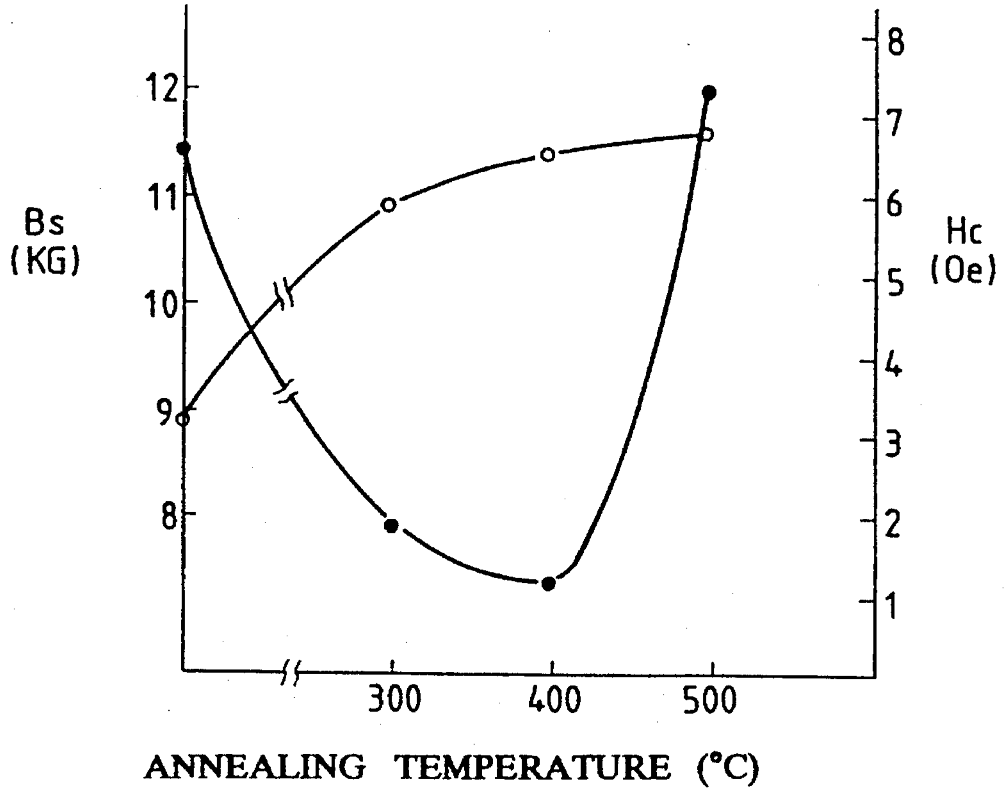

Similarly, FIG. 2 shows the results of the measurement of the saturation magnetic flux density (Bs), coercive force (Hc) and specific resistance (ρ) of an alloy film having a composition of $Fe_{68.5}Ho_{11.5}O_{20.0}$. In FIG. 2, the saturation magnetic flux density is indicated by (-○-○-), the coercive force is indicated by (-●-●-), and the specific resistance is indicated by (-Δ-Δ-).

It can be seen from FIG. 1 that the alloy film of the present invention having the composition of $Fe_{69.8}Sm_{11.0}O_{19.2}$ has a high saturation magnetic flux density of 12.1 kG, a low coercive force of 15 Oe and a high specific resistance of 610 μΩ.cm, thus indicating excellent soft magnetic properties, and it can be seen from FIG. 2 that the alloy film of the present invention having the composition of $Fe_{68.5}Ho_{11.5}O_{20.0}$ has a relatively low saturation magnetic flux density of 8.9 kG, but a low coercive force of 6.50 Oe; its specific resistance is as high as 1800 μΩ.cm.

Further, it can be seen that in both alloys, the saturation magnetic flux density (Bs) increases by performing heat treatment thereon. In particular, with the alloy film of the present invention having the composition of $Fe_{68.5}Ho_{11.5}O_{20.0}$the saturation magnetic flux density can be increased to a sufficient degree by performing heat treatment thereon. Further, it can be seen from FIG. 1 that with the alloy film of the present invention having the composition of $Fe_{69.8}Sm_{11.0}O_{19.2}$, the optimum annealing temperature is 500° C.

Furthermore, regarding the coercive force (Hc), annealed at 400° C. enables the coercive force to be minimized in both the alloy film having the composition of $Fe_{68.8}Sm_{11.0}O_{19.2}$ and the alloy film having the composition of $Fe_{68.5}Ho_{11.5}O_{20.0}$.

Thus, the alloy film of the present invention, subjected to anneal at a temperature of 300° C. to 600° C., can be regarded as a soft magnetic alloy film in which a high saturation magnetic flux density, a low coercive force and a high specific resistance are balanced on a high level.

Above all, by annealing at a temperature of 400° C., the alloy film having the composition of $Fe_{69.8}Sm_{11.0}O_{19.2}$ exhibits a high saturation magnetic flux density of 12.5 kG, a low coercive force of 1.5 Oe, and a high specific resistance of 450 μΩ.cm. The alloy film having the composition of $Fe_{68.5}Ho_{11.55}O_{20.0}$ exhibits a high saturation magnetic flux density of 11.4 kG, a low coercive force of 1.2 Oe, and a high specific resistance of 772 μΩ.cm, thus realizing well-balanced, excellent high-electric resistance soft magnetic properties.

(Test 2)

Fe—Sm—O alloy films and Fe—Ho—O alloy films were examined for the dependence of their specific resistances upon the Fe contents.

Figure 3:
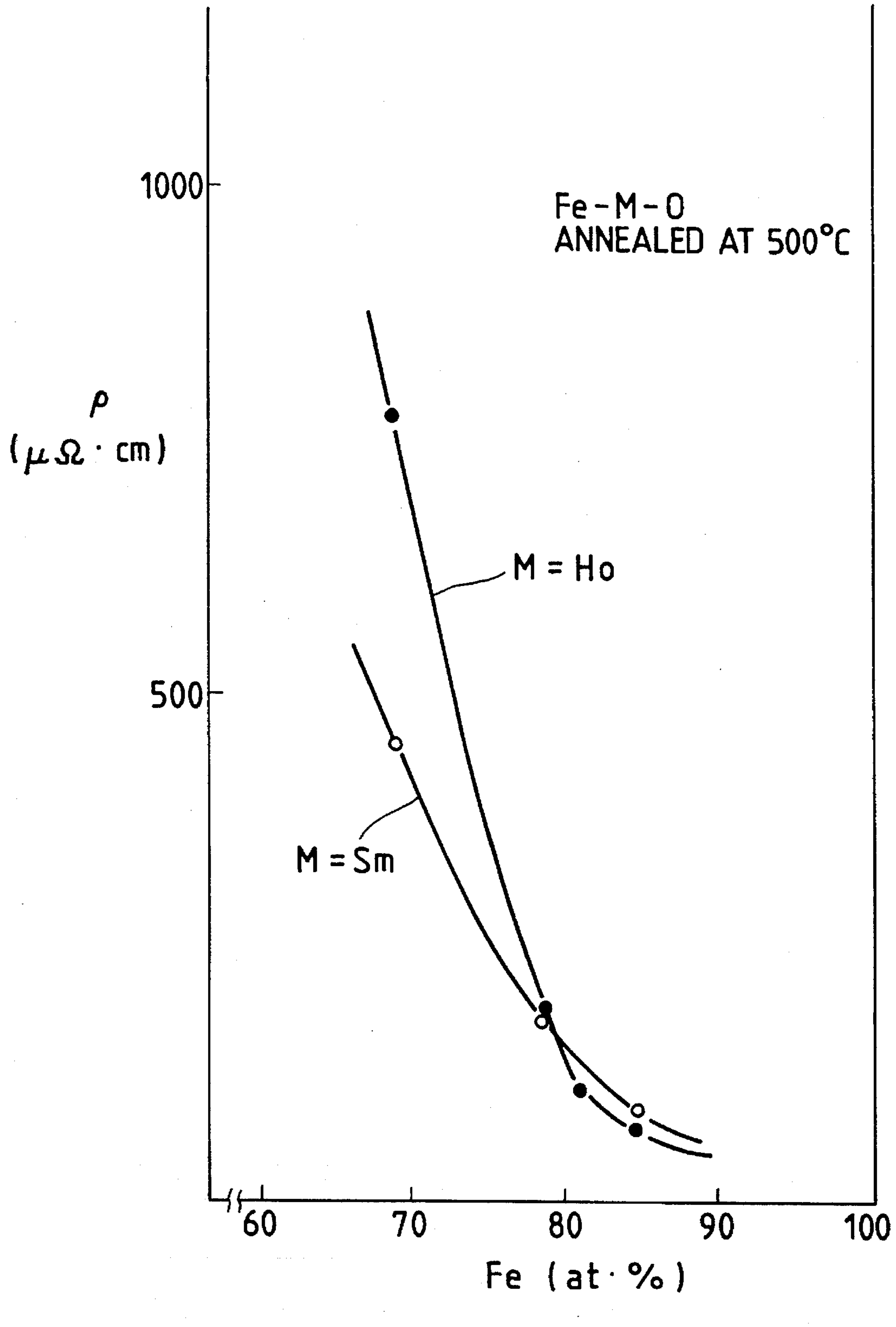
FIG. 3 is a graph showing the relationship between Fe content and specific resistance in alloy films according to embodiments of the present invention.

The respective electric resistances of these alloy films, which had been subjected to annealing at a temperature of 400° C., were measured. The measurement results are shown in FIG. 3. In FIG. 3, Fe—Sm—O alloy film is indicated by (-o-o-), and the Fe—Ho—O type alloy film is indicated by (-●-●-).

It can be seen from FIG. 3 that with both alloy films, the specific resistance rapidly increases as the Fe content decreases.

(Test 3)

An alloy film having a composition of $Fe_dHf_eO_f$ was subjected to annealing in a rotating magnetic field at a temperature of 400° C. for six hours to examine it for the dependence of its saturation magnetic flux density and specific resistance on the Hf content. In the alloy film of $Fe_dHf_eO_f$ examined, the Hf content was varied, with the Fe Content being held in the range of 45.6 atomic % or more, and the O content in the range of 33.5 to 36.9 atomic %. The measurement results are shown in FIGS. 4 and 5.

Figure 4:
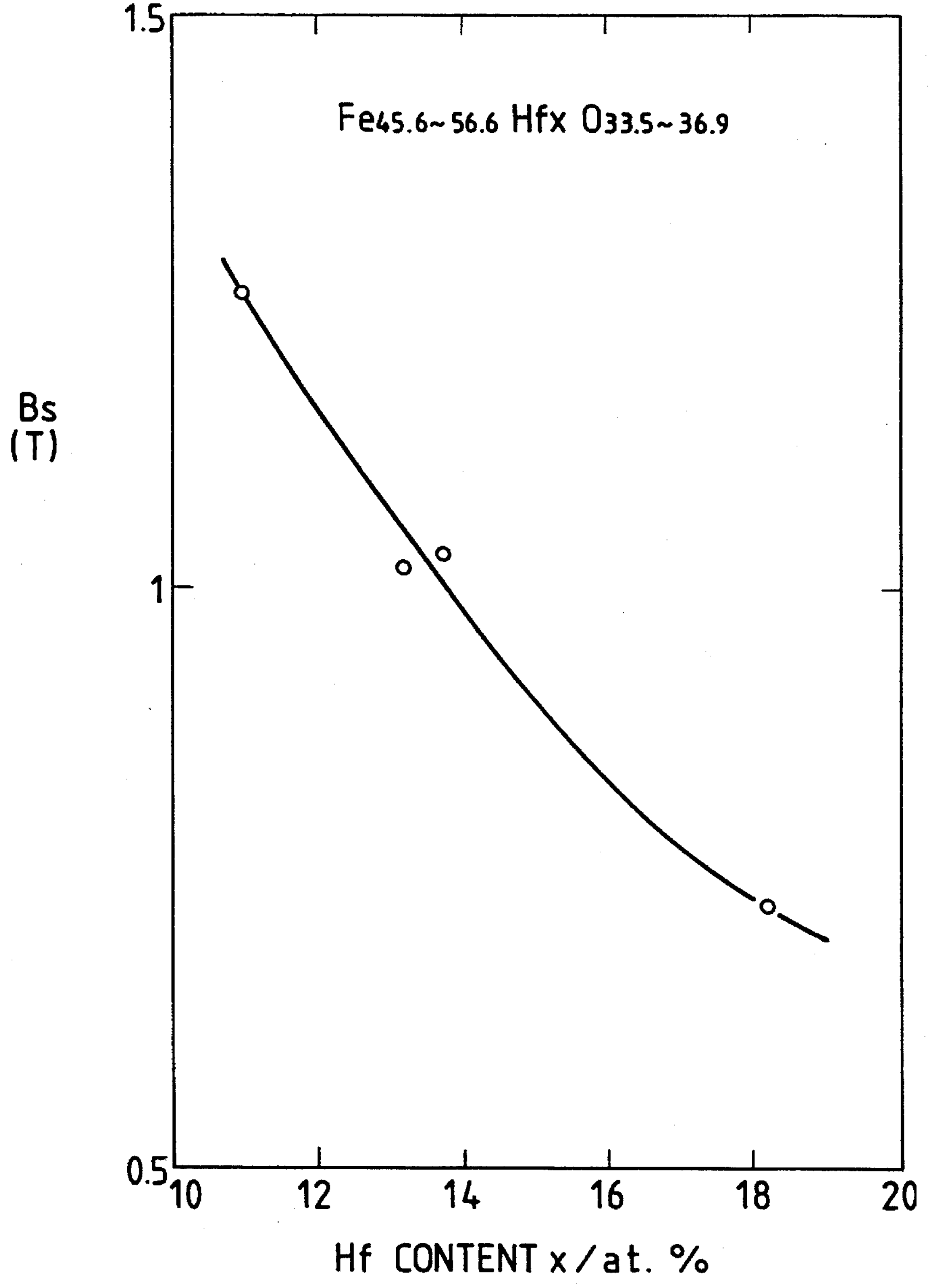
FIG. 4 is a graph showing the relationship between Hf content and saturation magnetic flux density in an Fe—Hf—O type alloy film according to the present invention.

It can be seen from FIG. 4 that an increase in the Hf content results in a reduction in saturation magnetic flux density.

Figure 5:
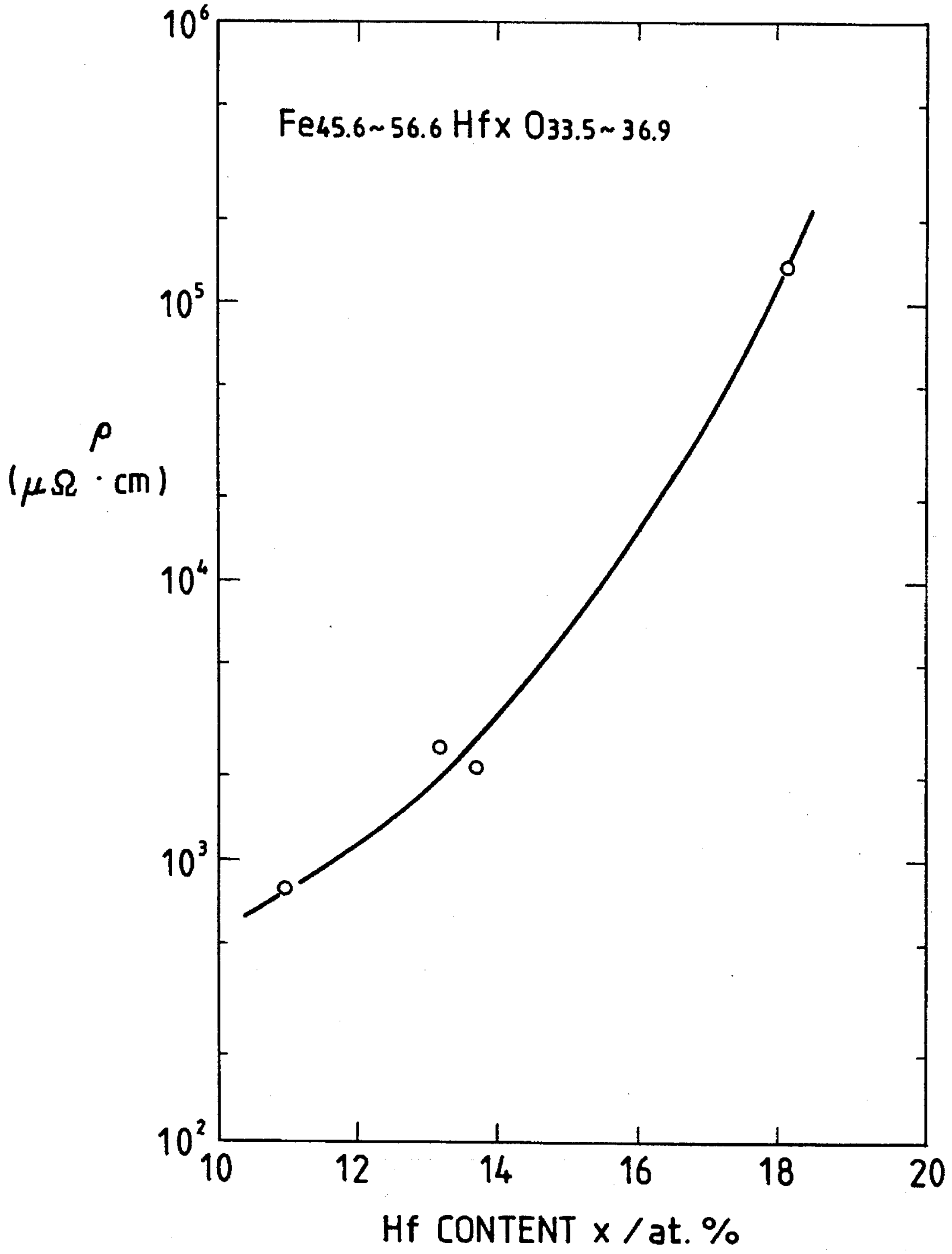
FIG. 5 is a graph showing the relationship between Hf content and specific resistance in an Fe—Hf—O type alloy film according to the present invention.

Further, it can be seen from FIG. 5 that by increasing the Hf content, the specific resistance is increased.

Figure 6:
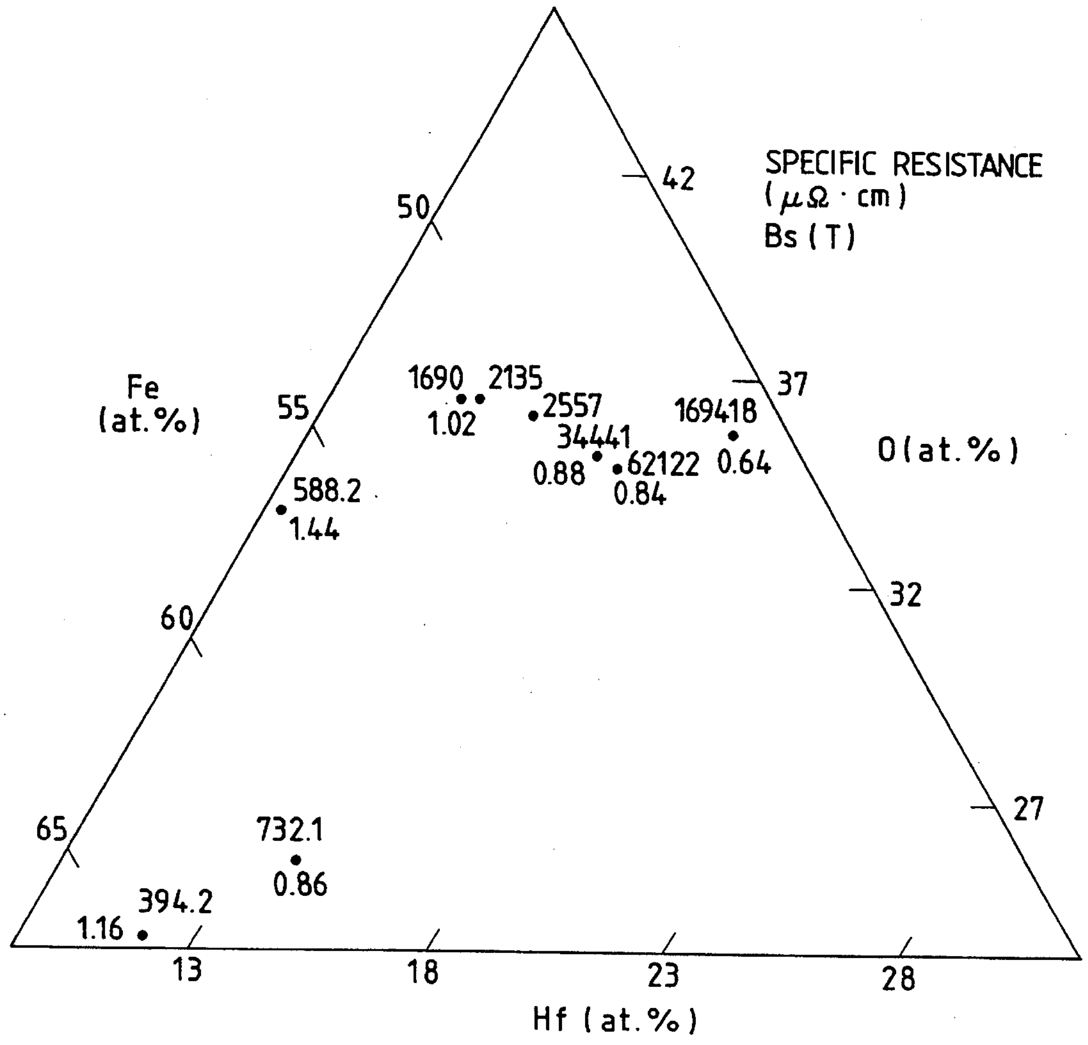
FIG. 6 is a triangular composition chart showing the saturation magnetic flux densities and/or specific resistances of Fe—Hf—O type alloy films of different compositions according to the present invention.

Further, these alloy films, having the composition of $Fe_dHf_eO_f$, were examined for the saturation magnetic flux densities and specific resistances at different composition ratios prior to heat treatment. The measurement results are shown in FIG. 6. In FIG. 6, the values above the points (.) indicating composition ratios are specific resistances (μΩ.cm), and the values given therebelow are saturation magnetic flux densities (T).

Table 1 shows the coercive forces and permeabilities, as well as the saturation magnetic flux densities and specific resistances, of soft magnetic alloys subjected to heat treatment in a magnetic field.

[Table 1]

It can be seen from FIG. 6 and Table 1 that the smaller the Fe content, the larger the specific resistance. Therefore, in the present invention, the lower limit of the Fe content was settled on 45 atomic % in order that a saturation magnetic flux density of 0.5 T or more may be maintained while achieving an increased specific resistance.

Further, it can be seen that even with a large Fe content, an Hf content of less than 5 atomic % or an O content of less than 10 atomic % results in a rather low specific resistance. The value of specific resistance prior to heat treatment of the alloy having a composition of $Fe_{46.2}Hf_{18.2}O_{35.6}$, shown in Table 1, is 194000 μΩ.cm. This suggests that it is possible to obtain a specific resistance of approximately $2.0\times10^5$ μΩ.cm from an alloy of this type.

(Test 4)

Figure 7:
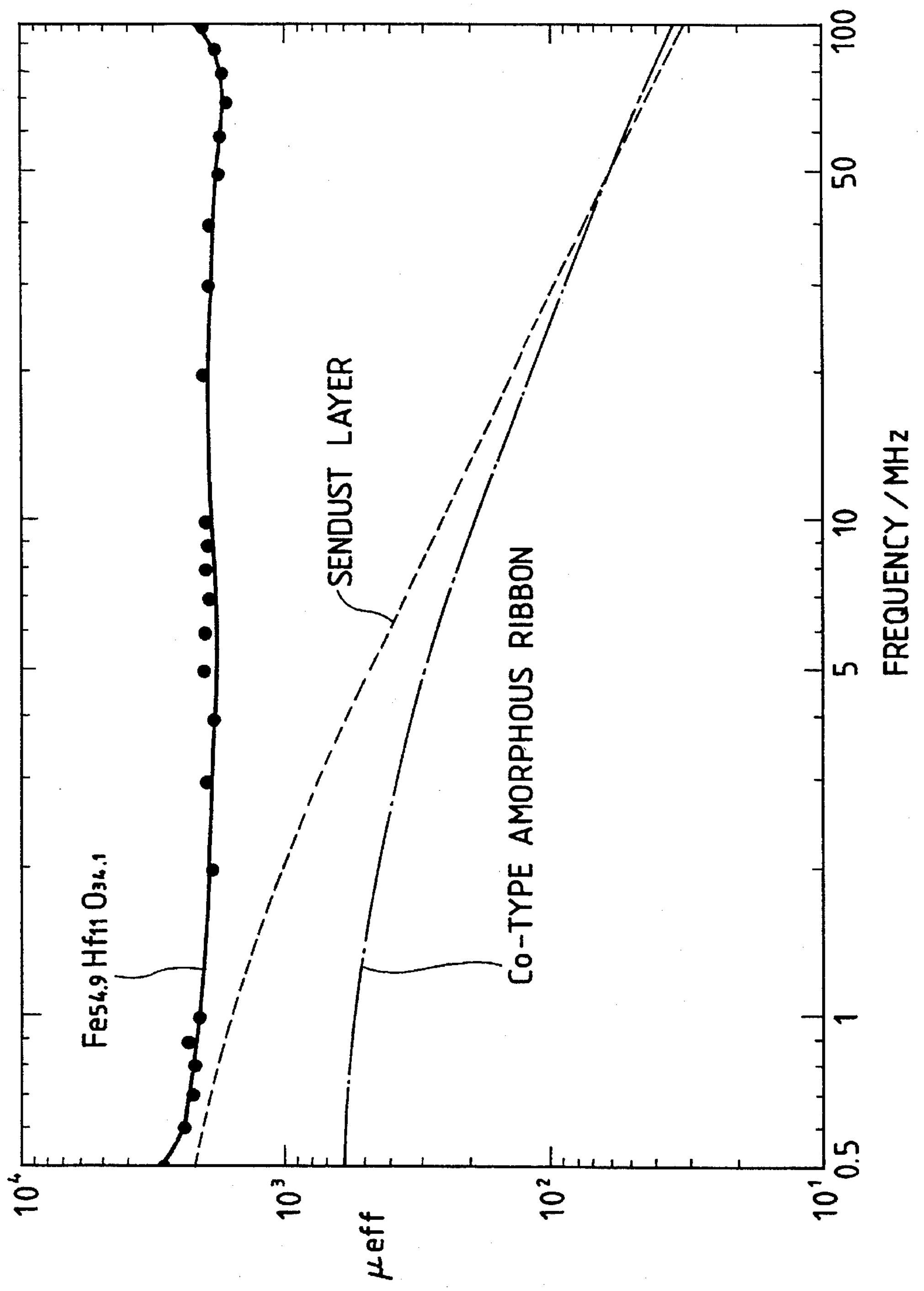
FIG. 7 is a graph showing the relationship between frequency of external magnetic field and magnetic permeability in a soft magnetic alloy film having a composition of $Fe_{54.9}Hf_{11}O_{34.1}$, a sendust film and a Co-base amorphous ribbon.

A measurement of magnetic permeability (μeff) was conducted while varying frequency of external magnetic field The samples measured were a film of an alloy having a composition of $Fe_{54.9}Hf_{11}O_{34.1}$, a sendust film, and a Co-base amorphous ribbon, which are subjected to heat treatment in a rotating magnetic field, at a temperature of 400° C. for six hours. The measurement results are shown in FIG. 7. In FIG. 7, the $Fe_{54.9}Hf_{11}O_{34.1}$ alloy film is indicated by a solid line, the sendust film is indicated by a dashed line, and the Co-base amorphous ribbon is indicated by a chain line.

It can be seen from FIG. 7, that in the sendust film and the Co-base amorphous ribbon, the higher the frequency, the lower the permeability. In contrast, in the soft magnetic alloy of this embodiment, having the composition of $Fe_{54.9}Hf_{11}O_{34.1}$, it is apparent that a high permeability is maintained even in the high frequency range, thus providing an excellent magnetic material for use in the high frequency range.

Figure 8:
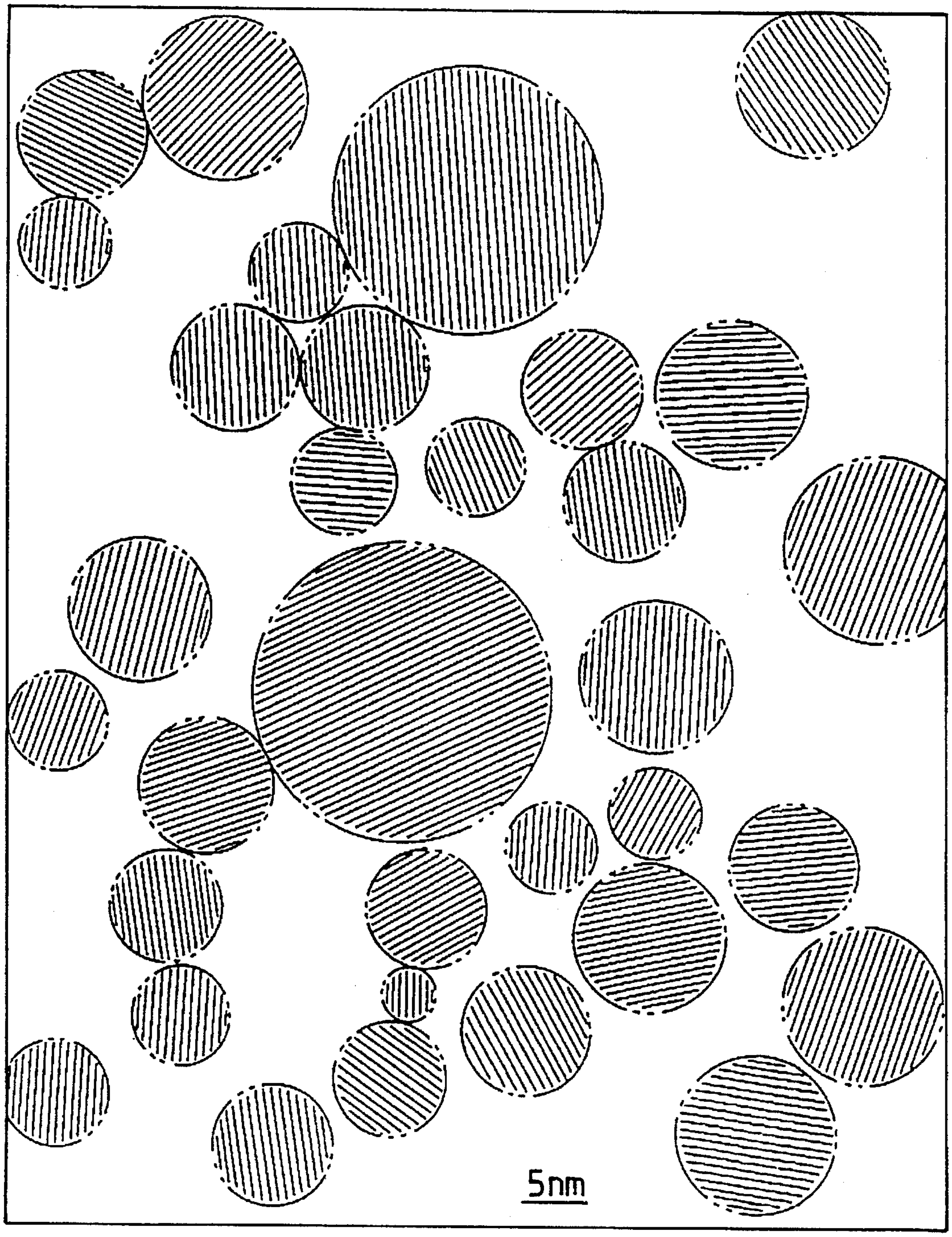
FIG. 8 is a schematic diagram showing a metallographic view of a soft magnetic alloy having a composition of $Fe_{54.9}Hf_{11}O_{34.1}$ and formed into a film.

FIG. 8 is a schematic diagram showing a metallographic view of a soft magnetic alloy having a composition of $Fe_{54.9}Hf_{11}O_{34.1}$ which has been formed into a film. In the drawing, a fine crystalline phase of Fe of b-c-c structure precipitates in the encircled regions, exhibiting a phase different from that of the remaining regions, which have an amorphous phase. Calculation of the area of the encircled regions in FIG. 8 showed that it accounts for approximately 50% of the entire area. Thus, it became apparent that in the soft magnetic alloy of this example, the fine crystal phase of Fe accounts for approximately 50%, and the amorphous phase approximately 50%. Further, judging from the scale of 5 nm shown in FIG. 8, every crystal grain apparently exhibits a sufficiently small grain size; calculation indicated an average grain size of 7 nm.

Figure 9:
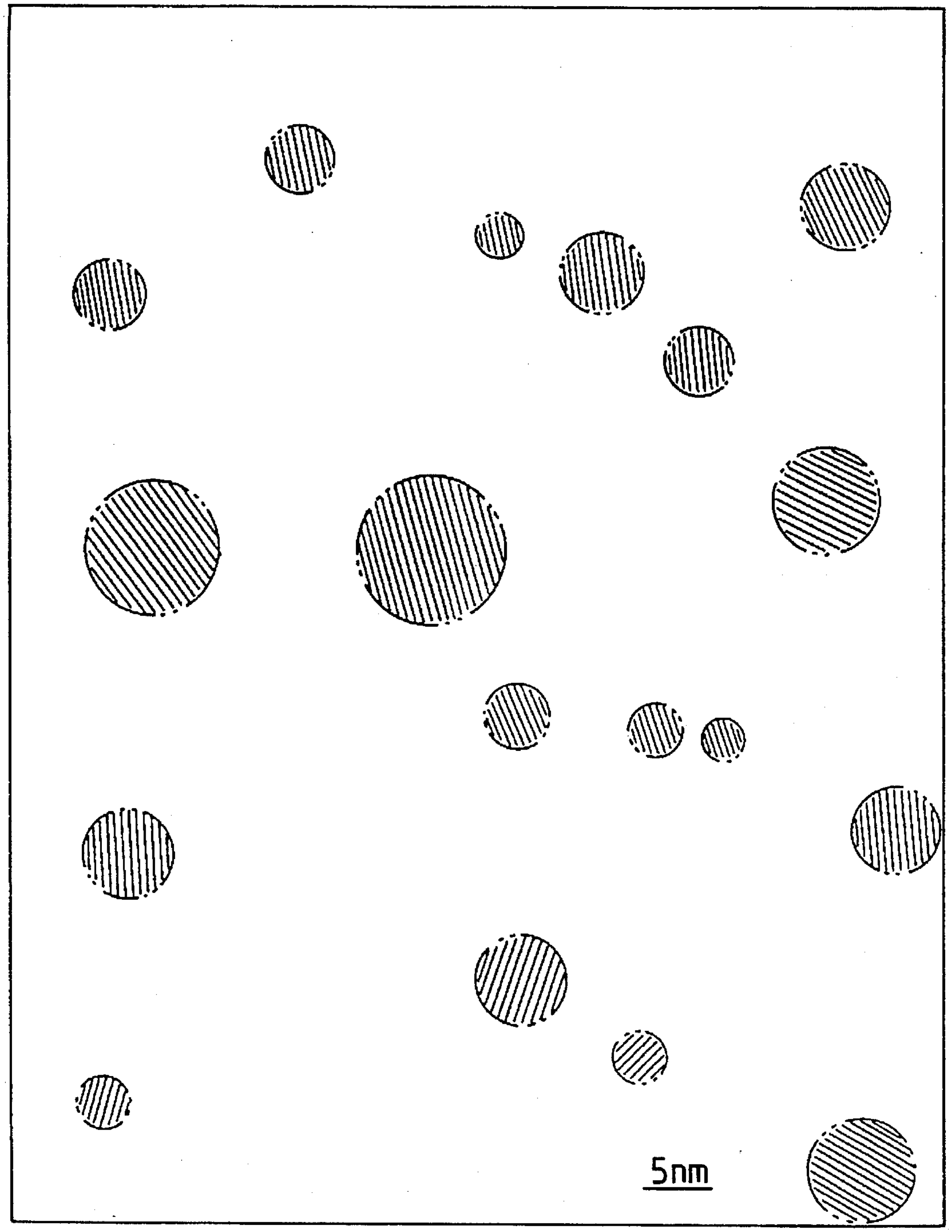
FIG. 9 is a schematic diagram showing a metallographic view of a soft magnetic alloy having a composition of $Fe_{46.2}Hf_{18.2}O_{35.6}$ and formed into a film.

FIG. 9 is a schematic diagram showing a metallographic view of a soft magnetic alloy having a composition of $Fe_{46.2}Hf_{18.2}O_{35.6}$ which has been formed into a film. In the drawing, a fine crystalline phase of Fe of b-c-c structure precipitates in the encircled regions, exhibiting a phase different from that of the remaining regions, which have an amorphous phase. Calculation of the area of the encircled regions in FIG. 9 showed that it accounts for approximately 10% of the entire area. Thus, it became apparent that in the soft magnetic alloy of this example, the fine crystalline phase of Fe accounts for approximately 10%. Further, judging from the scale of 5 nm shown in FIG. 9, every grain apparently exhibits a still smaller grain size; calculation indicated an average grain size of 4 nm.

Figure 10:
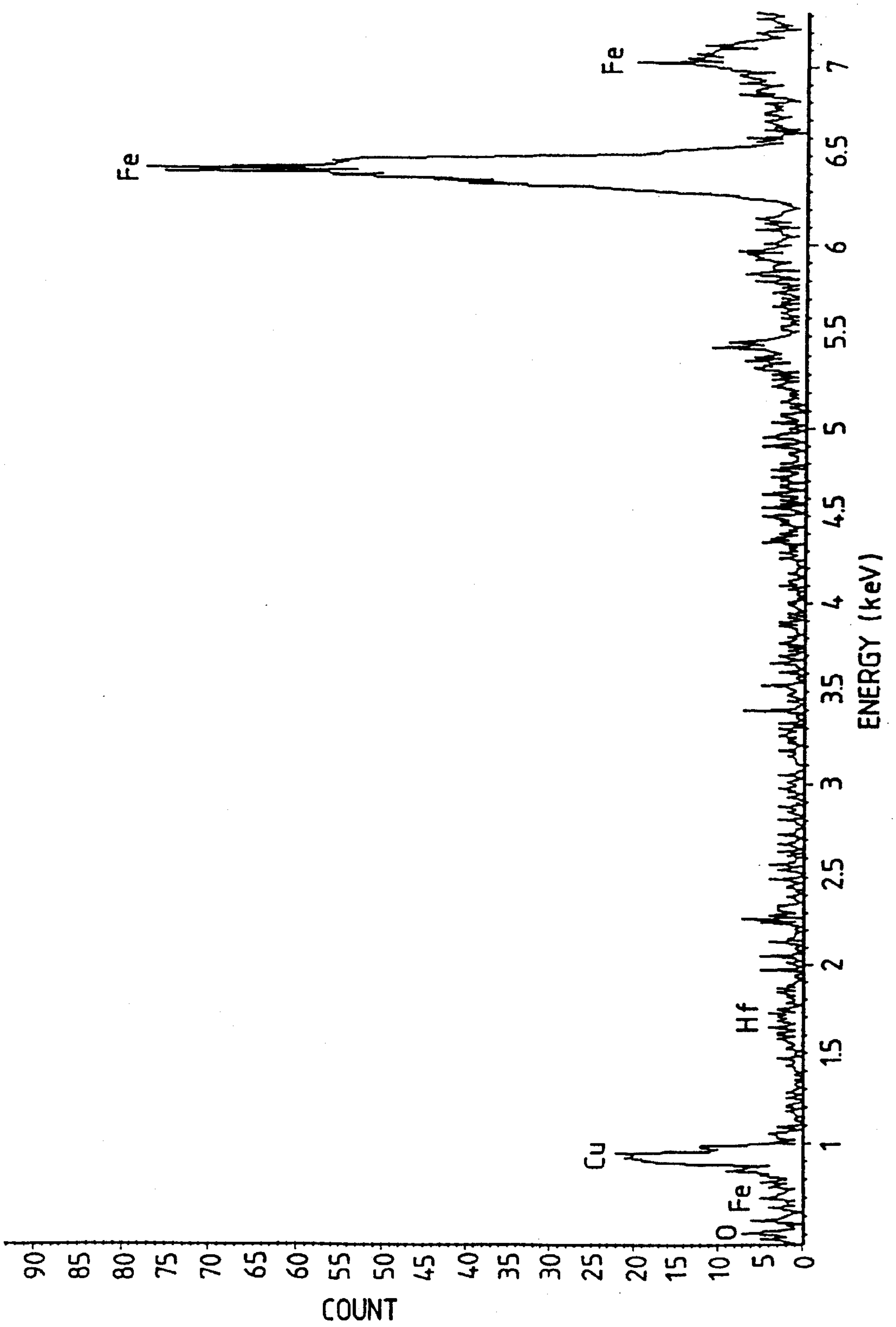
FIG. 10 is a graph showing the results of a measurement performed on the crystalline phase of a soft magnetic alloy film having a composition of $Fe_{46.2}Hf_{18.2}O_{35.6}$ by using an energy dispersion type X-ray spectrometer (EDS)
Figure 11:
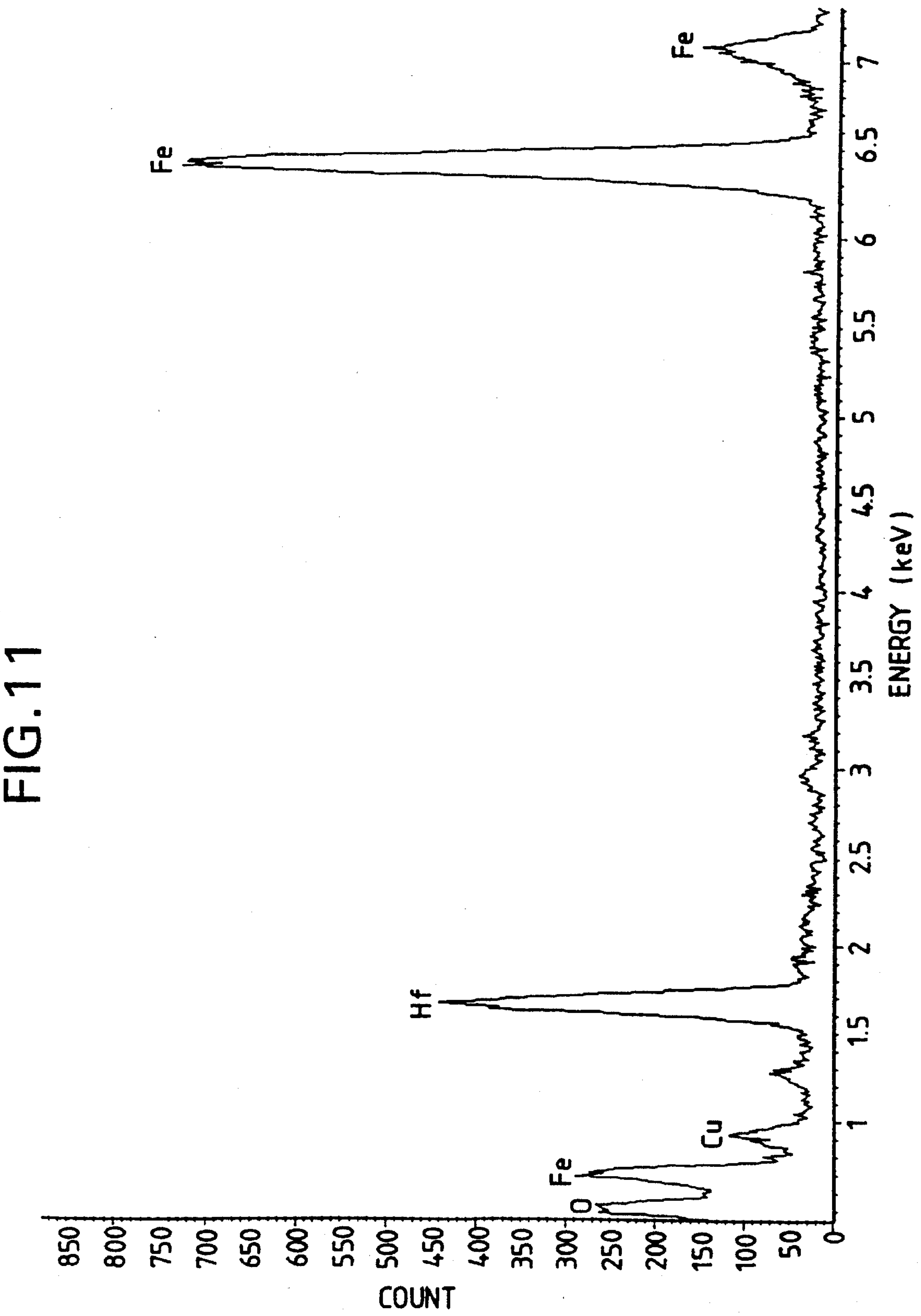
FIG. 11 is a graph showing the results of a measurement performed on the amorphous phase of a soft magnetic alloy film having a composition of $Fe_{46.2}Hf_{18.2}O_{35.6}$ by using an energy dispersion type X-ray spectrometer (EDS)

FIG. 10 shows analysis results obtained by measuring the crystalline phase portion of a soft magnetic alloy film having the same composition as the soft magnetic alloy film shown in the schematic diagram of FIG. 9, by using an energy dispersion type X-ray spectrometer (EDS); and FIG. 11 shows analysis results obtained by measuring the amorphous phase portion of the same soft magnetic alloy film. It can be seen from these results that the crystalline phase portion contains a large proportion of b-c-c Fe, and the amorphous phase portion contains Hf and O in high concentrations. The Cu peaks in the drawings are due to the EDS holder; they are not due to an element contained in the soft magnetic alloy film.

By comparing the results obtained from FIGS. 8 and 9 with the characteristic values shown in Table 1, it can be seen that the specimen having the metallographic structure of FIG. 9 contains a larger proportion of amorphous phase than the specimen having the structure shown in FIG. 8. Due to this larger proportion of amorphous phase, this specimen exhibits a substantial increase in specific resistance value, as shown in Table 1, with the coercive force thereof remaining substantially the same. Thus, it has been found that by reducing the proportion of the Fe fine crystalline phase to increase the proportion of the amorphous phase, it is possible to substantially increase the specific resistance without any change in coercive force.

Figure 12A:
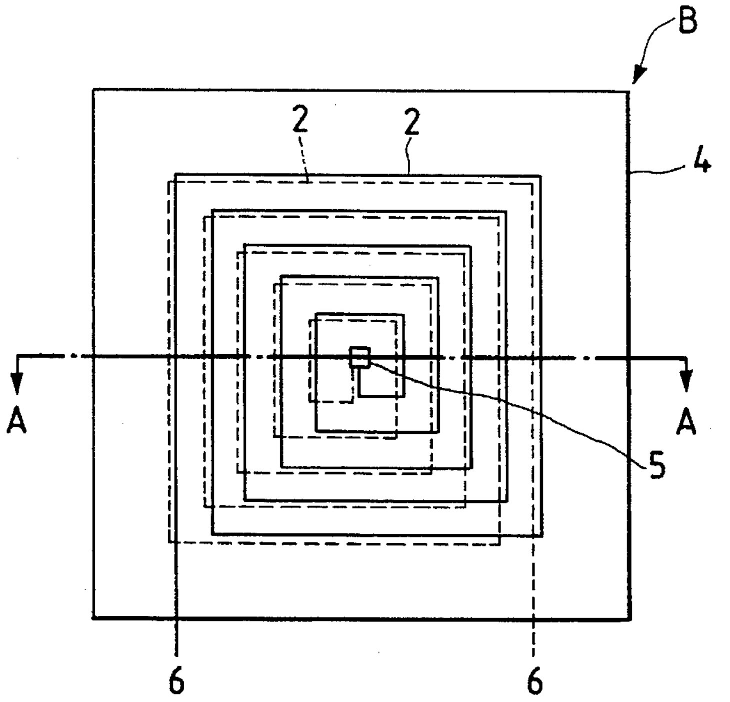
FIG. 12 (*a*) is a plan view showing a first embodiment of a plane magnetic element according to the present invention.
Figure 12B:
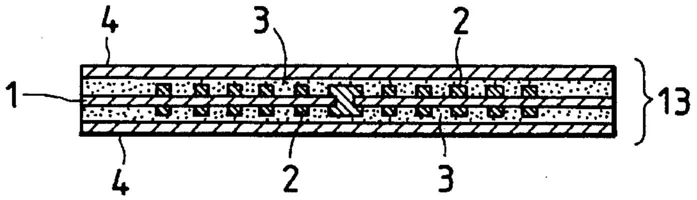

Next, FIGS. 12(*a*) and 12(*b*) show a first structure example of an inductor (plane magnetic element) made by using a magnetic film of a soft magnetic alloy having the above composition.

In the inductor of this example, generally indicated by symbol B, a spiral plane coil 2 is formed on either side of a substrate 1, and an insulating layer 3 covering each coil 2 and each side of the substrate surface is provided on either side. Each insulating layer 3 is covered with a magnetic film 4, and the central portions of the coils 2 are electrically connected to each other through a through-hole 5 formed at the center of the substrate 1. Further, a terminal 6 extends to the exterior of the substrate 1 from each coil 2.

In the inductor B, constructed as described above, the plane coils 2 are placed between the magnetic films 4 through the intermediation of the insulating layers 3, thereby forming an inductor between the terminals 6.

The substrate 1 consists of a ceramic substrate, an Si wafer substrate, a resin substrate or the like. When forming the substrate 1 by using a ceramic material, it is possible to appropriately select a material from among the following: alumina, zirconia, silicon carbide, silicon nitride, aluminum nitride, steatite, mullite, cordierite, forsterite, spinel, etc. However, in order for the coefficient of thermal expansion of the substrate to be close to that of Si, it is desirable to employ a material having a high thermal conductivity and a high level of flexural strength, such as aluminum nit ride.

The plane coils 2 are made of a highly conductive metal material, such as copper, silver, gold, aluminum or an alloy of these metals, and can be electrically connected in series and appropriately arranged longitudinally or laterally through the intermediation of the insulating layers in accordance with the inductance, DC superimposition characteristics, size, etc. Further, by arranging a plurality of plane coils 2 in parallel, it is possible to form a transformer. Further, the plane coils 2 can be formed into various shapes by photoetching after forming conductive layers on the substrate. The conductive layers can be formed by an appropriate method, such as press crimping, plating, metal spraying, vacuum deposition, sputtering, ion plating, screen printing, or sintering.

The insulating layers 3 are provided in order that when electricity is supplied to the plane coils 2, they may not conduct to the magnetic films 4 and thereby cause short-circuiting. It is desirable that the insulating layers 3 consist of a high molecular film, such as a polyimide film, or an inorganic film, such as an $SiO_2$ film, glass film or hard carbon film. The insulating layers 3 are formed by sintering after paste printing, or by a method, such as hot-dip plating, thermal spraying, vapor phase plating, vacuum deposition, sputtering or ion plating.

The magnetic films 4 consist of films of a soft magnetic alloy having a composition as described above. More specifically, the alloy has a composition of $Fe_aM_bO_c$; where M represents at least one of the rare earth elements (Sc and Y, which belong to Group 3A of the Periodic Table, or the lanthanoids, including La, Ce, Pr, Nd, Pm, Sm, Eu, Gd, Td, Dy, Ho, Er, Tm, Yb, Lu, etc. ) or a mixture thereof, the composition ratios a, b and c (in atomic %) being as follows: $50 \leqq a \leqq 70$, $5 \leqq b \leqq 30$, $10 \leqq c \leqq 30$, and $a+b+c=100$. The magnetic film 4 may also consist of a soft magnetic alloy having a composition of $Fe_dM'_eO_f$; where M' represents at least one of the elements, Ti, Zr, Hf, V, Nb, Ta and W, or a mixture thereof, the composition ratios d, e and f (in atomic %) being as follows: $45 \leqq d \leqq 70$, $5 \leqq e \leqq 30$, $10 \leqq f \leqq 40$, and $d+e+f=100$.

By applying a sinusoidal current having a frequency of several hundred kHz and an amplitude of several mA to the inductor B, constructed as described above, it is possible to perform inductance measurement to obtain measurement values in the order of several hundred μH. Further, the inductor B, having the above construction, is small, thin and light, and includes the magnetic films 4, which have excellent magnetic properties, so that it contributes to a reduction in size and weight: of plane magnetic elements, and exhibits an excellent inductance.

Figure 13:
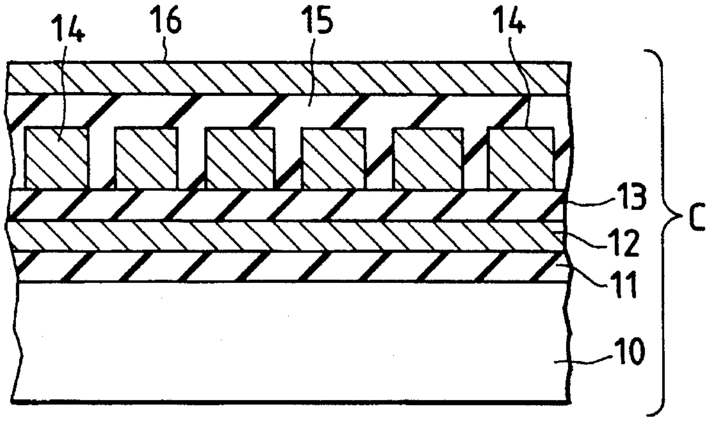
FIG. 13 is a sectional view showing a second embodiment of a plane magnetic element according to the present invention.

FIG. 13 shows a second structure example of an inductor formed by using a soft magnetic alloy film having a composition as described above.

In the inductor of this example, generally indicated by symbol C, an oxide film 11, a magnetic film 12, and an insulating layer 13 are laid in this order one on top of the other on a substrate 10. A plane coil 14 is formed on the insulating layer 13. An insulating layer 15 is formed in such a way as to cover the plane coil 14 and the insulating layer 13, and a magnetic film 16 is formed on the insulating layer 15.

The substrate 10 is made of a material which is equivalent to that of the substrate 1 in the above-described example, and the insulating layer 13 is made of a material which is equivalent to that of the insulating layers 3 in the above example.

Above all, the magnetic film 12 consists of a film of a soft magnetic alloy having a composition as described above. More specifically, the alloy has a composition of $Fe_aM_bO_c$; where M represents at least one of the rare earth elements (Sc and Y, which belong to Group 3A of the Periodic Table, and the lanthanoids, including La, Ce, Pr, Nd, Pm, Sm, Eu, Gd, Td, Dy, Ho, Er, Tm, Yb, Lu, etc.) or a mixture thereof, the composition ratios a, b and c (in atomic %) being as follows: $50 \leqq a \leqq 70$, $5 \leqq b \leqq 30$, $10 \leqq c \leqq 30$, and $a+b+c=100$. The magnetic film 12 may also consist of a soft magnetic alloy having a composition of $Fe_dM'_eO_f$; where M' represents at least one of the elements, Ti, Zr, Hf, V, Nb, Ta and W, or a mixture thereof, the composition ratios d, e and f (in atomic %) being as follows: $45 \leqq d \leqq 70$, $5 \leqq e \leqq 30$, $10 \leqq f \leqq 40$, and $d+e+f=100$.

When the substrate 10 consists, for example, of an Si wafer substrate, the oxide film 11 can be formed through thermal oxidation by heating an Si wafer. However, the oxide film 11 is not an essential component; it can be omitted.

Like the inductor B of the above-described example, the inductor C of this example, constructed as described above, exhibits an excellent inductance, is small and light, and contributes to a reduction in size and weight of plane magnetic elements.

As described above, the soft magnetic alloy of the present invention consists of an Fe-base alloy having a specific composition and specific composition ratios and providing a high saturation magnetic flux density, a low coercive force and a high specific resistance, so that it greatly contributes to a reduction in size and weight and enhancement in performance of magnetic elements, such as thin film transformers, magnetic head cores, thin film inductors and switching elements.

Further, by annealing on a soft magnetic alloy having the above composition at a predetermined temperature of 300° to 600° C., iris possible to substantially increase the saturation magnetic flux density of the alloy, or to adjust the values of the coercive force and specific resistance thereof while maintaining the saturation magnetic flux density at a high level. Thus, by appropriately setting the annealing temperature, it is possible to obtain a soft magnetic alloy having a high saturation magnetic flux density, and an appropriate coercive force and specific resistance depending on the use. Further, by appropriately selecting heat treatment conditions for a soft magnetic alloy according to the present invention, it is possible to obtain a high specific resistance of $400\sim1\times10^5$, so that when used to construct a magnetic element, a soft magnetic alloy according to the present invention is capable of restraining the eddy current loss in the high frequency range, thereby providing a magnetic element involving a small eddy current loss.

Further, by forming a plane coil on a substrate, covering it with an insulating layer, and providing a magnetic film of a soft magnetic alloy having a composition as described above in such a way as to cover the plane coil and the insulating layer to construct a plane magnetic element such as an inductor, it is possible to apply a magnetic film of an excellent soft magnetic alloy having a low coercive force, a high saturation magnetic flux density and a high specific resistance to a magnetic element, thereby providing a high-performance plane magnetic element which is small and light. Thus, it is possible to provide a plane magnetic element which is small and light.

TABLE 1

| Film Composition | Bs(T) | Hc(Oe) | ρ(μΩ · cm) | μeff (10 MHz) |
|---|---|---|---|---|
| $Fe_{54.9}Hf_{11.0}O_{34.1}$ | 1.2 | 0.8 | 803 | 2199 |
| $Fe_{51.5}Hf_{12.2}O_{36.3}$ | 1.1 | 1.2 | 1100 | 1130 |
| $Fe_{50.2}Hf_{13.7}O_{35.6}$ | 1.0 | 1.2 | 1767 | 147 |
| $Fe_{46.2}Hf_{18.2}O_{35.6}$ | 0.7 | 0.7 | 133709 | 100 |
| $Fe_{69.8}Zr_{6.5}O_{23.7}$ | 1.5 | 0.56 | 400 | 2050 |
| $Fe_{65.3}Zr_{8.9}O_{25.8}$ | 1.3 | 0.91 | 460 | 1030 |
| $Fe_{64.4}Nb_{12.2}O_{23.4}$ | 1.3 | 0.66 | 420 | 1600 |
| $Fe_{59.4}Ta_{15.3}O_{25.3}$ | 1.1 | 1.63 | 880 | 580 |
| $Fe_{51.5}Ti_{17.5}O_{31.0}$ | 1.1 | 1.38 | 750 | 420 |
| $Fe_{55.8}V_{13.2}O_{31.0}$ | 1.2 | 1.5 | 560 | 550 |
| $Fe_{58.7}W_{15.8}O_{25.5}$ | 1.2 | 2.25 | 670 | 400 |
| $Fe_{61.6}Y_{5.3}O_{33.1}$ | 1.4 | 1.31 | 420 | 780 |
| $Fe_{63.2}Ce_{7.8}O_{29.0}$ | 1.1 | 1.88 | 580 | 640 |
| $Fe_{69.8}Sm_{11.0}O_{19.2}$ | 1.3 | 2.0 | 500 | 400 |
| $Fe_{68.5}Ho_{11.5}O_{20.0}$ | 1.1 | 1.2 | 800 | 500 |
| $Fe_{64.2}Gd_{11.5}O_{24.3}$ | 1.2 | 3.4 | 840 | 350 |
| $Fe_{61.8}Tb_{10.8}O_{27.4}$ | 1.1 | 2.3 | 750 | 450 |
| $Fe_{62.5}Dy_{9.5}O_{28}$ | 1.1 | 4.0 | 680 | 530 |
| $Fe_{59.8}Er_{13.5}O_{26.7}$ | 1.0 | 3.7 | 580 | 380 |
| $Fe_{91.7}Hf_{4.1}O_{4.2}$ | | | 217.2 | |
| $Fe_{94.6}Hf_{2.0}O_{3.4}$ | | | 315.3 | |

TABLE 1-continued

| Film Composition | Bs(T) | Hc(Oe) | ρ(μΩ · cm) | μeff (10 MHz) |
|---|---|---|---|---|
| $Fe_{95.9}Hf_{1.0}O_{3.1}$ | | | 218.0 | |
| $Fe_{91.1}Hf_{2.1}O_{6.8}$ | | | 294.1 | |
| $Fe_{93.5}Hf_{1.0}O_{5.5}$ | | | 215.3 | |
| $Fe_{87.2}Hf_{3.5}O_{9.3}$ | | | 315.0 | |
| $Fe_{88.8}Hf_{2.1}O_{9.1}$ | | | 338.3 | |
| $Fe_{88.4}Hf_{2.1}O_{9.5}$ | | | 250.2 | |

What is claimed is:

1. A soft magnetic alloy film comprising:

a crystalline phase having an average grain size of 10 nm or less and consisting essentially of Fe having a b-c-c structure; and an amorphous phase consisting of:

Fe, at least one element from the group consisting of rare earth elements, Ti, Zr, Hf, V, Nb, Ta and W, and O (oxygen);

wherein said crystalline phase and amorphous phase exist in a mixed state, the crystalline phase and the amorphous phase constituting an entire soft magnetic alloy film structure, and wherein the proportion of said crystalline phase to the entire soft magnetic alloy film structure is 10 to 50%.

2. A soft magnetic alloy film according to claim 1, wherein said soft magnetic alloy film has a composition of $Fe_aM_bO_c$; where M represents at least one element selected from the group consisting of the rare earth elements, and wherein a, b and c represent amounts (in atomic %) as follows:

$50\leqq a\leqq 70$, $5\leqq b\leqq 30$, and $10\leqq c\leqq 30$, where $a+b+c=100$.

3. A soft magnetic alloy film according to claim 1, wherein the soft magnetic alloy film has a composition of $Fe_dM'_eO_f$; where M' represents at least one element selected from the group consisting of Ti, Zr, Hf, V, Nb, Ta and W, wherein d, e and f represent amounts (in atomic %) as follows:

$45\leqq d\leqq 70$, $5\leqq e\leqq 30$, and $10\leqq f\leqq 40$, where $d+e+f=100$.

4. A soft magnetic allot film according to claim 2, wherein said soft magnetic allot film has been annealed at a temperature of 300° C. to 600° C.

5. A soft magnetic alloy film according to claim 3, wherein said soft magnetic alloy film has been annealed at a temperature of 300° C. to 600° C.

6. A soft magnetic alloy film according to claim 4, wherein said soft magnetic alloy film exhibits a specific resistance of 400 to 1000 μΩ.cm.

7. A soft magnetic alloy film according to claim 5, wherein said soft magnetic alloy film exhibits a specific resistance of $400\sim2.0\times10^5$ μΩ.cm.

8. A plane magnetic element comprising:

a substrate, a spiral plane coil formed on the substrate, an insulating layer formed on the spiral plane coil, and a soft magnetic alloy film formed on the insulating layer, wherein said soft magnetic alloy film comprises:

a crystalline phase having an average grain size of 10 nm or less and consisting essentially of Fe having a b-c-c structure; and an amorphous phase consisting of:

Fe, at least one element from the group consisting of rare earth elements, Ti, Zr, Hf, V, Nb, Ta and W, and O (oxygen), wherein said crystalline phase and amorphous phase existing in a mixed state, the crystalline phase and the amorphous phase constituting an entire soft magnetic alloy film structure, and wherein the proportion of said crystal phase to the entire soft magnetic alloy film structure is 10 to 50%.

9. A plane magnetic element according to claim 8, wherein said soft magnetic alloy film has a composition of $Fe_aM_bO_c$; wherein M represents at least one element selected from the group consisting of the rare earth elements, wherein a, b and c represent amounts (in atomic %) as follows:

$50 \leqq a \leqq 70$, $5 \leqq b \leqq 30$, and $10 \leqq c \leqq 30$, where $a+b+c=100$.

10. A plane magnetic element according to claim 8, wherein said soft magnetic alloy film has a composition of $Fe_dM'_eO_f$; where M' represents at least one element from the group consisting of Ti, Zr, Hf, V, Nb, Ta and W, wherein d, e and f represent amounts (in atomic %) as follows:

$45 \leqq d \leqq 70$, $5 \leqq 30$, and $10 \leqq f \leqq 40$, where $d+e+f=100$.

* * * * *